(12) United States Patent
Muthuswamy

(10) Patent No.: US 11,640,442 B2
(45) Date of Patent: May 2, 2023

(54) METHOD AND SYSTEM FOR DATA TRANSFORMATION BASED ON MACHINE LEARNING

(71) Applicant: Wipro Limited, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 522 days.

(21) Appl. No.: 16/789,821

(22) Filed: Feb. 13, 2020

(65) Prior Publication Data
US 2021/0256415 A1 Aug. 19, 2021

(51) Int. Cl.
*G06N 20/00* (2019.01)
*G06F 17/16* (2006.01)
*G06F 40/20* (2020.01)

(52) U.S. Cl.
CPC .............. *G06F 17/16* (2013.01); *G06F 40/20* (2020.01); *G06N 20/00* (2019.01)

(58) Field of Classification Search
CPC ........ G06F 3/0481; G06F 3/0484; G06F 9/44; G06F 11/36; G06F 16/20; G06F 17/16; G06F 17/27; G06F 17/30; G06F 17/2785; G06F 40/20; G06F 40/279; G06K 9/00; G06K 9/34; G06K 9/62; G06N 5/00; G06N 7/00; G06N 20/00; G06T 7/00; G06T 15/30
USPC ................. 345/426, 581; 705/310–316, 342; 708/520; 717/100–103
See application file for complete search history.

(56) References Cited

U.S. PATENT DOCUMENTS 9,251,413 B2 2/2016 Meier et al.
2017/0228119 A1* 8/2017 Hosbettu ................ G06Q 10/00

OTHER PUBLICATIONS

Bridgwater, A., "Machine Learning Needs Human-In-The-Loop", https://www.forbes.com/sites/adrianbridgwater/2016/03/07/machine-learning-needs-a-human-in-the-loop/, Forbes, 2016, pp. 1-4.
Dooley, B., "Humans in the Loop for Machine Learning", https://tdwi.org/articles/2018/07/09/adv-all-humans-in-loop-for-machine-learning.aspx, TDWI Articles, 2018, pp. 1-5.
Harris, R., "How human assisted AI may be the Future", https://appdevelopermagazine.com/how-human-assisted-ai-may-be-the-future/, 2017, App Developer Magazine, pp. 1-12.

(Continued)

*Primary Examiner* — Shawkat M Ali
(74) *Attorney, Agent, or Firm* — Finnegan, Henderson, Farabow, Garrett & Dunner, LLP

(57) ABSTRACT

A method and system for data transformation based on machine learning is disclosed. The method includes generating a matrix for a plurality of input vectors based on a machine learning model. The method further includes comparing for each of the plurality of input vectors, the intent value in the matrix with a predefined intent threshold, wherein, for an intent value below the predefined intent threshold, an associated function is unavailable. The method further includes determining a first set of vectors from the plurality of input vectors based on the comparing, wherein for each input vector in the first set, the associated intent value is below the predefined intent threshold. The method further includes mapping, by the data transformation device, each input vector in the first set with an intent value above the predefined intent threshold and an associated function.

21 Claims, 13 Drawing Sheets

(56) References Cited

OTHER PUBLICATIONS

Sons, O., "3 Brilliant Uses of Human-Assisted Machine Learning", https://www.transcribeme.com/human-assisted-machine-learning, Transcribe Me, 2018, pp. 1-6.

Venkatesh, M., "What is Human-in-the-Loop for Machine Learning?", https://hackernoon.com/what-is-human-in-the-loop-for-machine-learning-2c2152b6dfbb, 2018, Hackernoon, pp. 1-8.

Woodie, A., "Unleashing Artificial Intelligence with Human Assisted Machine Learning", https://www.datanami.com/2016/03/17/unleashing-artificial-intelligence-human-assisted-machine-iearning/, datanami, 2016, pp. 1-3.

* cited by examiner

| Training Data 802a | Training Vectors 802b | Output Values 804 | Keys (K) 806 | Intent Values (G) 808 | Functions (F) 810 | Entities (V) 812 | Flag (T) 814 |
|---|---|---|---|---|---|---|---|
| < 60 | < | 0 to 59 | fd6d930a | 0 | F0 | {60} | TRUE |
| <= 60 | <= | 0 to 60 | 6edd992f | 1 | F1 | {60} | TRUE |
| >18 | > | 19 to 100 | 1363f226 | 2 | F2 | {18} | TRUE |
| >= 18 | >= | 18 to 100 | 19daa9b9 | 3 | F3 | {18} | TRUE |
| less than 13 | less than | 0 to 12 | 21d7e9f6 | 0 | F0 | {13} | TRUE |
| less than or equal to 13 | less than or equal to | 0 to 13 | fd4005c6 | 1 | F1 | {13} | TRUE |
| greater than 16 | greater than | 17 to 100 | ff4d3605 | 2 | F2 | {16} | TRUE |
| greater than or equal to 16 | greater than or equal to | 16 to 100 | 58b8a7d4 | 3 | F3 | {16} | TRUE |

FIG. 8

| Row 902 | Input Data 904a | Input Vectors (Xi) 904b | Output Values (Yi) 906 | Flags (E) 908 | Keys (K) 910 | Intent Values (G) 912 | Entities (V) 914 | Flags (T) 916 |
|---|---|---|---|---|---|---|---|---|
| 1 | 18 and under | and under | | TRUE | 13b15d81 | -1 | {18} | FALSE |
| 2 | Less than 16 | less than | 0 to 15 | FALSE | 21d7e9f6 | 0 | {16} | FALSE |
| 3 | < 16 | < | 0 to 15 | FALSE | fd6d930a | 0 | {16} | FALSE |
| 4 | 60 and Under | and under | | TRUE | 13b15d81 | -1 | {60} | FALSE |
| 5 | 18 and above | and above | | TRUE | 226ef8cf | -1 | {18} | FALSE |
| 6 | 58 and UNDER | and under | | TRUE | 13b15d81 | -1 | {58} | FALSE |
| 7 | < 12 | < | 0 to 11 | FALSE | fd6d930a | 0 | {12} | FALSE |
| 8 | Greater than 18 | greater than | 19 to 100 | FALSE | ff4d3605 | 2 | {18} | FALSE |
| 9 | ge 20 | ge | | TRUE | 56bd7a48 | -1 | {20} | FALSE |
| 10 | <= 18 | <= | 0 to 18 | FALSE | 6edd992f | 1 | {18} | FALSE |
| 11 | less than 60 | less than | 0 to 60 | FALSE | 21d7e9f6 | 0 | {60} | FALSE |
| 12 | greater than 57 | greater than | 58 to 100 | FALSE | ff4d3605 | 2 | {57} | FALSE |
| 13 | Ge 60 | ge | | TRUE | 56bd7a48 | -1 | {60} | FALSE |
| 14 | Gt 12 | gt | | TRUE | 3c0d5aba | -1 | {12} | FALSE |
| 15 | gt 18 | gt | | TRUE | 3c0d5aba | -1 | {18} | FALSE |
| 16 | gt 16 but lt 60 | gt but lt | | TRUE | 0f927f7e | -1 | {16, 60} | FALSE |

FIG. 9

| Row 902 | Input Data (Xi) 904a | Input Vectors 904b | Keys (K) 910 | Intent Values (G) | Entities (V) 914 |
|---|---|---|---|---|---|
| 1 | 18 and under | and under | 13b15d81 | 1 | {18} |
| 4 | 60 and Under | and under | 13b15d81 | 1 | {60} |
| 5 | 18 and above | and above | 56bd7a48 | 3 | {18} |
| 6 | 58 and UNDER | and under | 13b15d81 | 1 | {58} |
| 9 | ge 20 | ge | 56bd7a48 | 3 | {20} |
| 13 | Ge 60 | ge | 56bd7a48 | 3 | {60} |
| 14 | Gt 12 | gt | 3c0d5aba | 2 | {12} |
| 15 | gt 18 | gt | 3c0d5aba | 2 | {18} |
| 16 | gt 16 but lt 60 | gt but lt | 0f92717e | 4 | {16, 60} |

FIG. 11

| Row 902 | Input Data (Xi) 904a | Input Vector (Xi) 904b | Output Values (Yi) 906 | Flags (E) 908 | Keys (K) 910 | Intent Values (G) 912 | Entities (V) 914 | Flags (T) 916 |
|---|---|---|---|---|---|---|---|---|
| 1 | 18 and under | and under | 0 to 18 | FALSE | 13b15d81 | 1 | {18} | FALSE |
| 2 | Less than 16 | less than | 0 to 15 | FALSE | 21d7e9f6 | 0 | {16} | FALSE |
| 3 | < 16 | < | 0 to 15 | FALSE | fd6d930a | 0 | {16} | FALSE |
| 4 | 60 and Under | and under | 0 to 60 | FALSE | 13b15d81 | 1 | {60} | FALSE |
| 5 | 18 and above | and above | 18 to 100 | FALSE | 56bd7a48 | 3 | {18} | FALSE |
| 6 | 58 and UNDER | and under | 0 to 58 | FALSE | 13b15d81 | 1 | {58} | FALSE |
| 7 | < 12 | < | 0 to 11 | FALSE | fd6d930a | 0 | {12} | FALSE |
| 8 | Greater than 18 | greater than | 19 to 100 | FALSE | ff4d3605 | 2 | {18} | FALSE |
| 9 | ge 20 | ge | 20 to 100 | FALSE | 56bd7a48 | 3 | {20} | FALSE |
| 10 | <=18 | <= | 0 to 18 | FALSE | 6edd992f | 1 | {18} | FALSE |
| 11 | less than 60 | less than | 0 to 60 | FALSE | 21d7e9f6 | 0 | {60} | FALSE |
| 12 | greater than 57 | greater than | 58 to 100 | FALSE | ff4d3605 | 2 | {57} | FALSE |
| 13 | Ge 60 | ge | 60 to 100 | FALSE | 56bd7a48 | 3 | {60} | FALSE |
| 14 | Gt 12 | gt | 13 to 100 | FALSE | 3c0d5aba | 2 | {12} | FALSE |
| 15 | gt 18 | gt | 19 to 100 | FALSE | 3c0d5aba | 2 | {18} | FALSE |
| 16 | gt 16 but lt 60 | gt but lt | 17 to 59 | FALSE | 0f927f7e | 4 | {16, 60} | FALSE |

FIG. 12

METHOD AND SYSTEM FOR DATA TRANSFORMATION BASED ON MACHINE LEARNING

TECHNICAL FIELD

This disclosure relates generally to machine learning, and more particularly to method and system for machine learning based data transformation.

BACKGROUND

Artificial Intelligence (AI) is rapidly becoming a part of our daily lives. One of the dominant AI technique is machine learning. In machine learning paradigm a data set is obtained based on mapping between inputs and their respective outputs. This data set is fed into an ML algorithm that trains an ML model to learn a function for producing the mapping of inputs and their respective outputs, with reasonably high accuracy. The function produced during training may produce the desired output for new input based on mapping. Hence, it can be said that the accuracy of ML algorithms may be limited by the availability of high-quality training data.

Moreover, new pattern in an input data is a common scenario when dealing with unstructured data. Furthermore, if the ML model is not trained to handle that new input pattern, it would reject that new pattern and may raise an exception to attract human attention for a resolution. Human resolution may come into effect after retraining of the ML model and may apply on future inputs with similar patterns. However, it may be obvious that human intervention may be critical if the new input patterns are repetitive and occurring at a high rate. For example, talent acquisition firm may receive job applications and resumes with data having unstructured attributes, such as, date of birth, education qualification, age, work experience, degree, etc. For these unstructured attributes the talent acquisition firm may identify a need to automate the standardization of job application and resumes, which are in varying non-standard formats. None of the existing training technique deploys ML as an autonomous solution where there may be no ambiguity in predictions used in decision making.

SUMMARY

In an embodiment, a method for data transformation based on machine learning is disclosed. In one embodiment, the method may include generating, by a data transformation device, a matrix for a plurality of input vectors based on a machine learning model. For each of the plurality of input vectors, the matrix comprises a set of parameters comprising at least one of a key, at least one entity, an intent value from a plurality of intent values, or a function associated with the intent value. The method may further include comparing, by the data transformation device, for each of the plurality of input vectors, the intent value in the matrix with a predefined intent threshold. For an intent value below the predefined intent threshold, an associated function is unavailable. The method may further include determining, by the data transformation device, a first set of vectors from the plurality of input vectors based on the comparing. For each input vector in the first set, the associated intent value is below the predefined intent threshold. The method may further include mapping, by the data transformation device, each input vector in the first set with an intent value above the predefined intent threshold and an associated function.

In another embodiment, a system for data transformation based on machine learning is disclosed. The system includes a processor and a memory communicatively coupled to the processor, wherein the memory stores processor instructions, which, on execution, causes the processor to generate a matrix for a plurality of input vectors based on a machine learning model. For each of the plurality of input vectors, the matrix comprises a set of parameters comprising at least one of a key, at least one entity, an intent value from a plurality of intent values, or a function associated with the intent value. The processor instructions further causes the processor to compare for each of the plurality of input vectors, the intent value in the matrix with a predefined intent threshold. For an intent value below the predefined intent threshold, an associated function is unavailable. The processor instructions further causes the processor to determine a first set of vectors from the plurality of input vectors based on the comparing. For each input vector in the first set, the associated intent value is below the predefined intent threshold. The processor instructions further causes the processor to map each input vector in the first set with an intent value above the predefined intent threshold and an associated function.

In yet another embodiment, a non-transitory computer-readable storage medium is disclosed. The non-transitory computer-readable storage medium has instructions stored thereon, a set of computer-executable instructions causing a computer comprising of one or more processors to perform steps comprising generating, by a data transformation device, a matrix for a plurality of input vectors based on a machine learning model, wherein for each of the plurality of input vectors, the matrix comprises a set of parameters comprising at least one of a key, at least one entity, an intent value from a plurality of intent values, or a function associated with the intent value; comparing, by the data transformation device, for each of the plurality of input vectors, the intent value in the matrix with a predefined intent threshold, wherein, for an intent value below the predefined intent threshold, an associated function is unavailable; determining, by the data transformation device, a first set of vectors from the plurality of input vectors based on the comparing, wherein for each input vector in the first set, the associated intent value is below the predefined intent threshold; and mapping, by the data transformation device, each input vector in the first set with an intent value above the predefined intent threshold and an associated function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 illustrates a matrix that includes training vectors processed during training of an ML model, in accordance with an exemplary embodiment.

FIG. 9 illustrates a matrix that includes a set of parameters generated after processing a plurality of input vectors based on a trained ML model, in accordance with an exemplary embodiment.

FIG. 11 illustrates a matrix that includes modified parameter values after resolving a set of exceptions within a plurality of input vectors, in accordance with an exemplary embodiment.

FIG. 12 illustrates a matrix that includes a set of parameters for each of a plurality of input vectors after fixing of a set of resolved exceptions, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
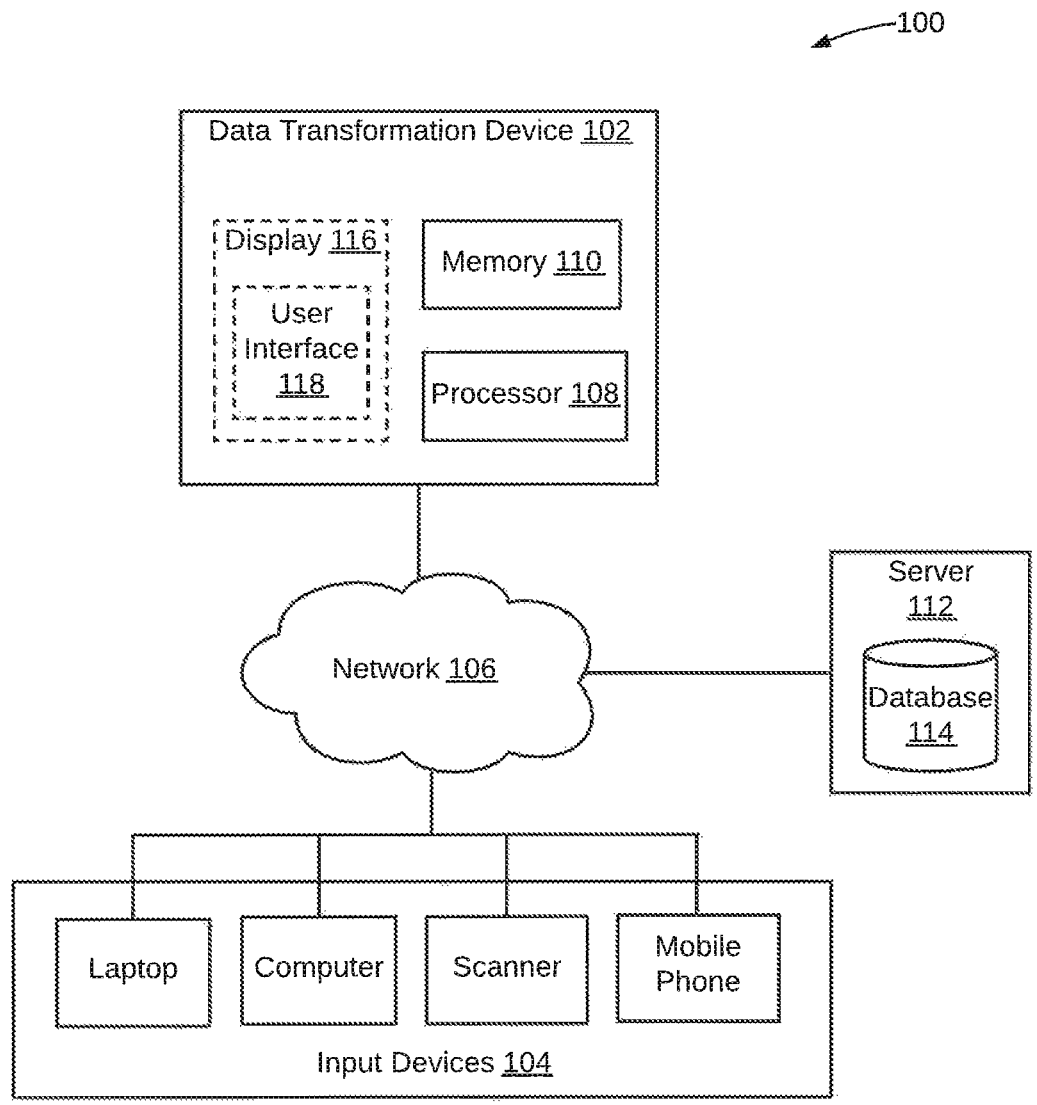
FIG. 1 is a block diagram illustrating a system for data transformation based on machine learning, in accordance with an embodiment.

In one embodiment, a system 100 for data transformation based on machine learning is illustrated in FIG. 1. The system 100 may include a data transformation device 102 that has processing capabilities for transforming a plurality of input data (which are first converted to a plurality of input vectors) into a structured format based on Machine Learning (ML). Example of the plurality of input data may include, but are not limited to, patient age, working hours in office, and date of birth. This is further explained in detail in conjunction with FIG. 3. The input data may include unstructured data and the structured format may correspond to an output value that is unambiguous. Alternatively, the plurality of input data may include structured data, and the data transformation device 102 may transform it into a standardized structured format that can be processed by the data transformation device 102. Examples of the data transformation device 102 may include, but are not limited to an application server, a desktop, a laptop, a notebook, a netbook, a tablet, a smartphone, or a mobile phone.

The plurality of input data may be received by the data transformation device 102 from input devices 104. Examples of the input devices 104 may include, but are not limited to a desktop, a laptop, a notebook, a netbook, a tablet, a server, or a smartphone. The input devices 104 are communicatively coupled to the data transformation device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The data transformation device 102 may also extract the plurality of input data from a server 112 via the network 106 in order to extract the plurality of input vectors from the plurality of input data. The server 112 may include a database 114 that may be updated periodically with a new set of input data that needs data transformation.

As will be described in greater detail in conjunction with FIG. 2 to FIG. 12, in order to transform the plurality of input data into the structured format, the data transformation device 102 may include a processor 108 which may be communicatively coupled to a memory 110. The memory 110 may store processor instructions, which when executed by the processor 108 may cause the processor 108 to transform the plurality of input data into the structured format. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

The data transformation device 102 may further include a display 116 that may further include a user interface 118. A user or an administrator may interact with the data transformation device 102 and vice versa through the display 116. The display 116 may be used to display an intermediate result or a final result of data transformation of one or more of the plurality of data, as performed by the data transformation device 102. The user interface 118 may be used by the user to provide inputs on the intermediate results (for resolution of data exceptions) to the data transformation device 102.

Figure 2:
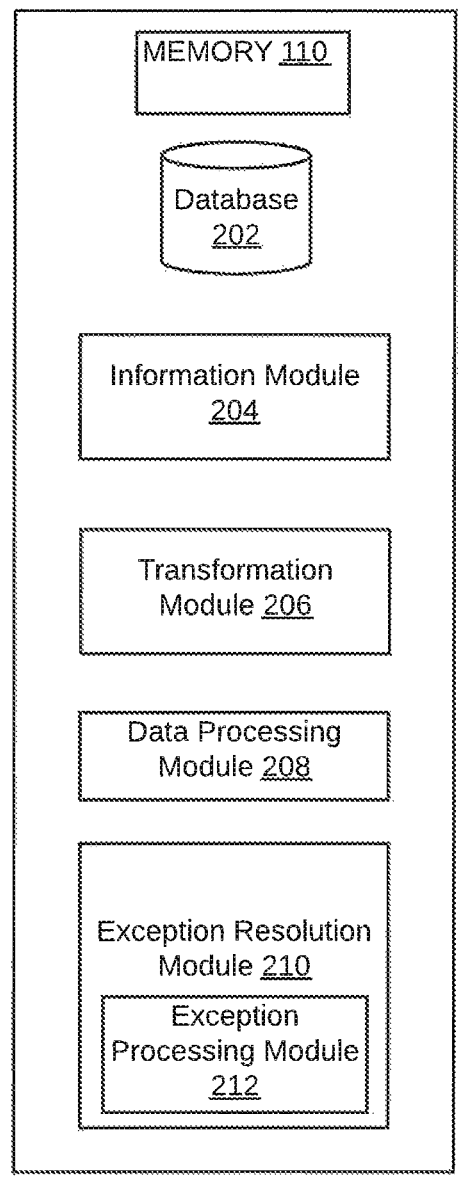
FIG. 2 illustrates a functional block diagram of various modules within a memory of a data transformation device configured to transform input data into structured format, in accordance with an embodiment.

Referring now to FIG. 2, a functional block diagram of various modules within the memory 110 of the data transformation device 102 configured to transform a plurality of input data to a structured format is illustrated, in accordance with an embodiment. The memory 110 may include a database 202, an information module 204, a transformation module 206, a data processing module 208, and an exception resolution module 210. The exception resolution module 210 may further include an exception processing module 212. Further, the information module 204 may include an information map and the transformation module 206 may include a transformation map. As will be appreciated by those skilled in the art, all such aforementioned modules 202-212 may be represented as a single module or a combination of different modules. Moreover, as will be appreciated by those skilled in the art, each of the modules 202-212 may reside, in whole or in parts, on one device or multiple devices in communication with each other.

The database 202 may be a relational database that may include a set of parameters corresponding to a plurality of input vectors, a first set of vectors, a second set of vectors, output values corresponding to the second set of vectors, and intermediate processed data. For a given input vector, the set of parameters may include at least one of, but is not limited to a key generated for the input vector, one or more entities in the input vector, an intent value from a plurality of intent values, and a function associated with the intent value. The plurality of input vectors may be generated from a plurality of input data that corresponds to unstructured data. In an embodiment, the plurality of input vectors may be word vectors and Natural Language Processing (NLP) techniques may be used to generate the plurality of input vectors. For a given input vector, a hashing algorithm may be used to generate a key for the input vector, which would uniquely represent the input vector.

The first set of vectors may correspond to a set of exceptions generated based on processing of the plurality of input vectors and the second set of vectors may correspond to those vectors for which output may be generated post processing of the plurality of input vectors. Thus, the database 202 may provide a view of different stages of processing of the plurality of input vectors. The database 202 may be updated in response to updates performed on the information map and the transformation map.

In an embodiment, the information module 204 may maintain the information map that includes a mapping between one or more keys (K) and an intent value (G) from the plurality of intent values. In other words, there is a many-to-one mapping between multiple keys and a particular intent value. In an embodiment, a hashing algorithm may be used to generate a HashMap <K, G>, where K is the unique key and G is the intent value mapped to the unique key. The information map may additionally include a route to the transformation module 206. The transformation module 206 may maintain the transformation map that includes a mapping between each of the plurality of intent values and an associated function, Thus, there is a one-to-one mapping between intent values and associated functions, while there is a many-to-one mapping between keys and intent values. The transformation module 206 may include a code for implementing the function associated with an intent value. The transformation module 206 may store mapping of the intent values with their associated function in a lookup table. The lookup table may be regularly updated based on incremental learning performed for exceptions (i.e., the first set of vectors) identified from the plurality of input vectors.

The data processing module 208 may act as a functional unit that may facilitate processing of the set of training vectors and the plurality of input vectors. The processing of the set of training vectors and the plurality of input vectors is similar and is thus done using same framework and method with some minor changes. The data processing module 208 may process the set of training vectors and the plurality of input vectors through the hashing algorithm, so as to generate a hash map <K, G> for each vector (whether a training vector or an input vector).

As explained before, for a given vector, K is the unique key generated as the hash value for the vector and G is an intent value associated with that unique key. In addition, data processing module 208 may also process each of the set of training vectors and the plurality of input vectors to extract one or more entities (V) corresponding to each vector. Once the hash map <K, G> is generated, for a given vector, the data processing module 208 may communicate with the information module 204 (to access the information map) and the transformation module 206 (to access the transformation map) to find a function (F) associated with the intent value (G). As detailed earlier, multiple keys may be mapped to one intent value, and thus have a many-to-one mapping (saved in the information map). In contrast, a given intent value may be mapped to a single function, and thus there will always be a one-to-one mapping between intent values and associated functions. Once the data processing module 208 has generated the hash map <K G> and identified the associated function (F), for a given vector, the data processing module 208 may generate an output value (Y) using equation 1 given below:

$$Y=F(V) \quad (1)$$

Additionally, based on the hash map <K, G>, the data processing module 208 may identify the first set of vectors from the plurality of input vectors. The data processing module 208 may save the first set of vectors as an exception that would be processed later (i.e., as an intermediate processed data) in the database 202. In an embodiment, the data processing module 208 may additionally mark vectors with one of an E flag or a T flag in the database 202. The E flag may be used to distinguish the first set of vectors (i.e., the set of exceptions) from a second set of vectors (for which output value may be generated) in the plurality of input vectors. The value of E flag may be set to FALSE to indicate or mark the second set of vectors for which an output value is generated. In contrast, value of E flag may be set to TRUE for the first set of vectors which are identified as the set of exceptions. The set of exceptions correspond to a set of unprocessed vectors that do not have output values because of an unmapped function. While E flag is used for the plurality of input vectors, T flag is used for the set of training vectors in order to distinguish from the plurality of input vectors. To this end, T flag is set to TRUE for the set of training vectors and the T flag is set to FALSE for the plurality of input vectors. This is further explained in detail in conjunction with FIG. 8 to FIG. 12.

The data processing module 208 may also synchronize changes in the information map and the transformation map. In an embodiment, the changes in the information map and transformation map may be done based on resolution of the first set of vectors. The resolution of the first set of vectors may be performed by a user or may be performed automatically. This is further explained in detail in conjunction with FIG. 3. The data processing module 208 may reload the database 202 in response to resolution of the first set of vectors. In an embodiment, the data processing module 208 may synchronize changes based on a reload-request notification generated by the exception resolution module 210. After successfully completing the reload, the data processing module 208 may generate a reload-complete notification and may initialize itself for a restart.

The exception resolution module 210 may import the first set of vectors from the database 202. The exception resolution module 210 may then provide the first set of vectors (via a user interface) to a user (for example, an administrator), who may examine each of the first set of vectors and subsequently resolve them. The first set of vectors may be resolved by the user in bulk or one at a time. Moreover, the user may resolve the first set of vectors based on information available in the information map and the transformation map in the database 202. This is further explained in detail in conjunction with FIG. 3.

In addition, the set of exceptions (i.e., the first set of vectors) from the plurality of input vectors are segregated into different sections by the exception resolution module

210. Thus, it may be sufficient to only resolve one entry from multiple exceptions that all have the same key (K), since each key (K) may be mapped to exactly one intent value (G), and each intent value (G) may further be mapped to exactly one function (F). This technique may be termed as sufficient exception resolution (SER). The exception resolution module 210 may provide a user with features, such as, but not limited to viewing data exceptions (per page list), sorting, searching and filtering of a matrix, searching and listing of the keys, bulk or single editing and saving of the data exceptions, refreshing or exporting exception list (as csv or excel file) for faster resolution.

Additionally, the exception resolution module 210 may send an update notification to the exception processing module 212. In return, the exception resolution module 210 may receive an update-complete notification from the exception processing module 212. Also, the exception resolution module 210 may send reload-request notification to the data processing module 208 and, in return, may receive the reload-complete notification from the data processing module 208. Moreover, the exception resolution module 210 may provide an Integrated Development Environment (IDE) for dynamically producing new functions and enabling resolution of one or more of the first set of vectors. This may eliminate the need for upgrading software via expensive Software Development Life Cycle (SDLC) process.

The exception processing module 212 may receive the update notification from the exception resolution module 210. The update notification may include mapping between a key, an intent value, and a function associated with the intent value for each of the first set of vectors. The exception processing module 212 may then filter the first set of vectors based on unique keys received. For each unique key filtered, the exception processing module 212 may update the corresponding intent value.

Thereafter, the exception processing module 212 may fetch one or more entities corresponding to each of the first set of vectors. For each of the first set of vectors, the exception processing module 212 may then execute the associated function on the corresponding one or more entities as an argument for generating corresponding output values (Y). The output values may be generated based on the equation (1) given above. The exception processing module 212 may then update the information map and the transformation map based on the resolving of the first set of vectors. Additionally, the exception processing module 212 may store the output values corresponding to each of the first set of vector in the database 202. The output value (Y) may be directly fed into a downstream data pipeline for further processing. The exception processing module 212 may also clear E flag corresponding to the first set of vectors in the database 202. Lastly, the exception processing module 212 may send an update-complete notification to the exception resolution module 210.

Figure 3:
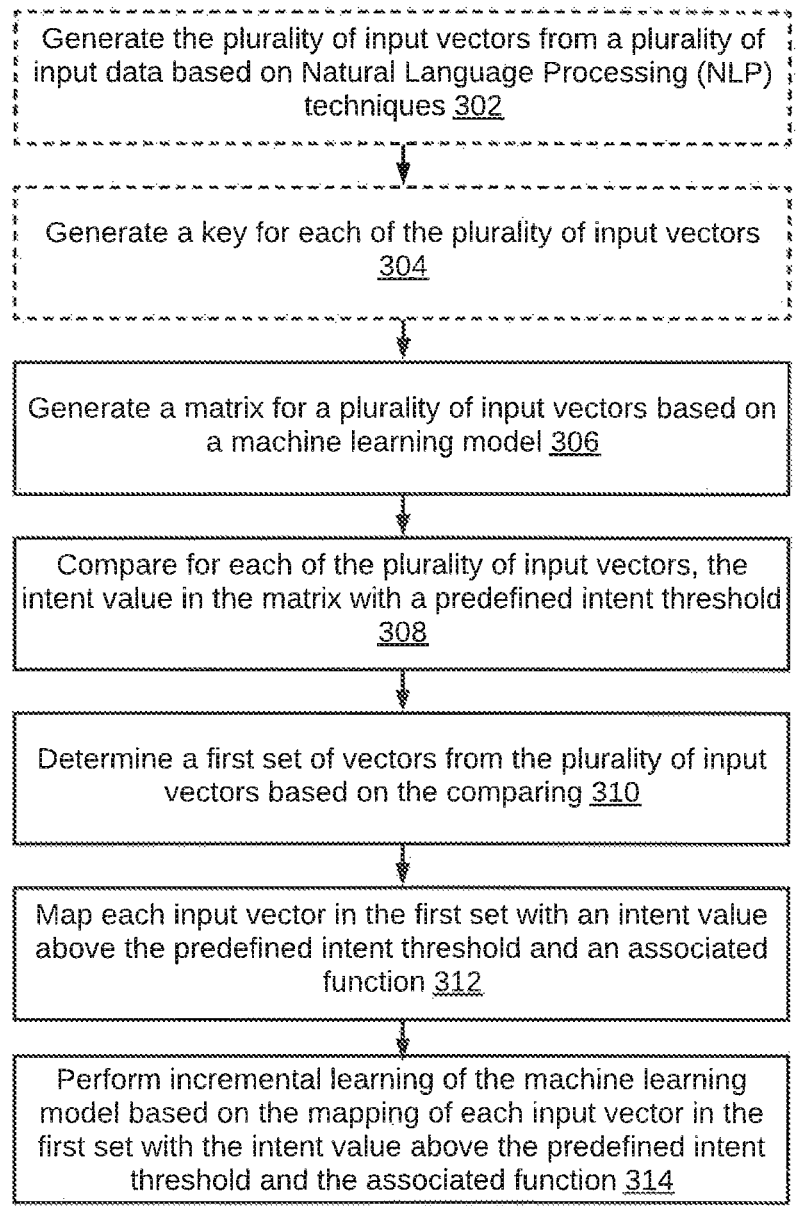
FIG. 3 illustrates a flowchart of a method for data transformation based on machine learning, in accordance with an embodiment.

Referring now to FIG. 3 a flowchart of a method for data transformation based on ML is illustrated, in accordance with an embodiment. In an embodiment, steps 302-314 may be performed by the data transformation device 102. At step 302, the plurality of input vectors are generated from a plurality of input data, based on NLP techniques. Each of the plurality of input vectors may be an input word vector and the plurality of input data may be unstructured data. Thereafter, at step 304, a key may be generated for each of the plurality of input vectors. In an embodiment, the key may be generated based on a hashing algorithm. The hashing algorithm may then utilize the plurality of input vectors to generate the hashmap <K, G> based on the key and the intent value (G). Additionally, at step 304, one or more entities may also be identified for each of the plurality of input vectors.

At step 306, a matrix may be generated for the plurality of input vectors based on an ML model. For a given input vector, the matrix may include a set of parameters, which may further include one or more of a key generated for the input vector, one or more entities identified from the input vector, an intent value from a plurality of intent values, and a function associated with the intent value. The set of parameters may additionally include an output value for the input vector and one or more flags (for example, E flag and T flag, which have been explained in detail above). It will be apparent to a person skilled in the art that the matrix may include the set of parameters associated with each of the plurality of input vectors. By way of an example, an input data may be value in a cell of a column that includes patient's age: "Less than 16". Based on an input vector "less than" generated for this input data, the set of parameters may include the key as 21d7e9f6 the entity as 16 the intent value as 0 and the function as F(0). Additionally, the output values may be "0 to 15", E flag may be FALSE, and T flag may be FALSE. This is further explained in detail in conjunction with FIG. 8 to FIG. 10.

In the matrix, an intent value may be assigned to an input vector based on whether the key generated for the input vector matches with one of set of keys associated with a set of training vectors. Each of the set of keys are already mapped to one of the plurality of intent values, which are greater than or equal to a predefined intent threshold. The predefined intent threshold may correspond to a value that may help in determining presence of a function to process an input vector in order to generate an output. In an embodiment, for an intent value below the predefined intent threshold, an associated function may not have been defined in the data transformation device 102. By way of an example, the predefined intent threshold may be 0. Thus, in this case, each of the set of keys are mapped to intent values that are 0 or any number greater than 0. In other words, when the key of the input vector matches with a key associated with a training vector, the intent value mapped to the key associated with the training vector is assigned to the key of the input vector. This is further explained in detail in conjunction with FIG. 4 and FIG. 8 to FIG. 10.

At step 308, the intent value for each of the plurality of input vectors is compared with the predefined intent threshold. Based on the comparing, at step 310, a first set vectors is determined from the plurality of vectors, such that, for each input vector in the first set, the associated intent value is below the predefined intent threshold. In other words, a key generated for each vector in the first set does not match with the set of keys associated with the set of training vectors. In continuation of the example above, each of the first set of vectors may have been assigned a value that is less than 0, for example, −1. In this example, the data transformation device 102 may look for a specific value, i.e., −1 in the intent column of the matrix. By way of another example, any value other than −1 but below 0 may be assigned to each of the first set of vectors. In this example, the data transformation device 102 may look for any value or a range of values that are below 0 in the intent column of the matrix.

The first set of vectors are identified as a set of exceptions from the first plurality of vectors. Once the first set of vectors is identified, each input vector in the first set may be mapped with an intent value above the predefined intent threshold and the associated function at the step 312. The mapping may be performed automatically or may be performed manually by a user. Different methods of mapping may be used, which have been explained in detail in conjunction with FIG. 5, FIG. 6, and FIG. 10 to FIG. 12. Based on the mapping, at step 314, an incremental learning is performed for the ML model.

Figure 4:
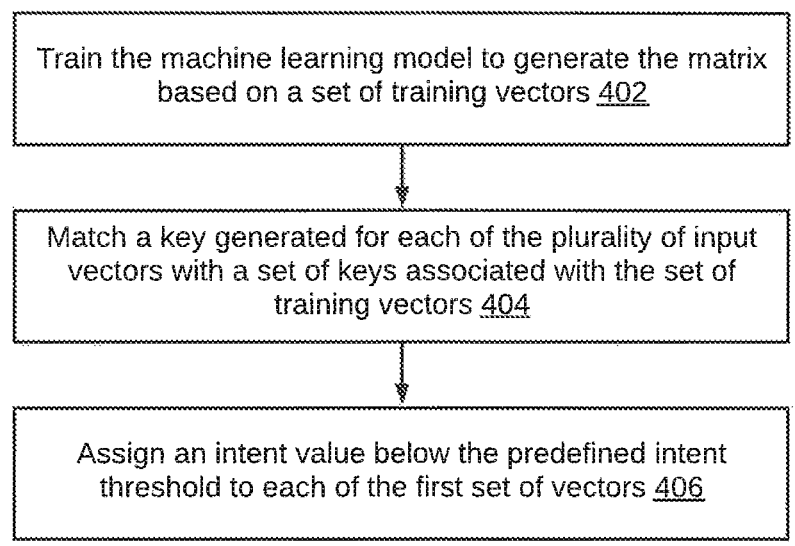
FIG. 4 illustrates a flowchart of a method for assigning an intent value to each of a plurality of input vectors based on a set of training vectors, in accordance with an embodiment.

Referring now to FIG. 4, a flowchart of a method for assigning an intent value to each of a plurality of input vectors based on a set of training vectors is illustrated, in accordance with an embodiment. At step 402, the ML model is trained based on the set of training vectors to generate a matrix for a plurality of training vectors. Each of the set of training vector may include an associated set of training parameters. For a given training vector, the set of training parameters may include a key generated for the training vector, one or more entities in the training vector, an intent value from the plurality of intent values, and a function associated with the intent value. In other words, for the training vector, the key is mapped to each of: one or more entities, an intent value, and a function associated with the intent value. The intent value assigned to each of the set of training vectors is greater than or equal to the predefined intent threshold. In continuation of the example given in FIG. 3, an intent value of 0 or above may be assigned to keys generated for each of the set of training vectors. In an embodiment, the set of training vectors may correspond to a data pattern generated by analyzing a sample of the historical input data. The method of training the ML model is explained in greater detail in conjunction with FIG. 8.

As described in FIG. 3, based on training of the ML model, the ML model generates the matrix for the plurality of input vectors. To this end, at step 404, the key generated for each of the plurality of input vectors is matched with the set of keys associated with the set of training vectors. A key for a given input vector may match with a key from the set of keys associated with the set of training vectors. The key from the set of keys may already be mapped to an intent value and a function associated with the intent value. Thus, in this case, the key for the given input vector may also be mapped to the same intent value and the function associated with the intent value.

However, in another scenario, a key for a given input vector may not match with any key in the set of keys associated with the set of training vectors. In this case, the given input vector is identified as an exception from the plurality of input vectors. All such exceptions identified from the plurality of input vectors in combination are determined as a first set of vectors. Once the first set of vector is determined, at step 406, while generating the matrix for the plurality of input vectors, each of the first set of vectors may be assigned an intent value below a predefined intent threshold. The assigning of the intent value to each of the first set of vectors may either be performed manually by a user or automatically by the ML model. By way of an example, when the predefined intent threshold is 0, each of the first set of vectors may be assigned an intent value of −1. This is further explained with exemplary embodiments illustrated in FIG. 8 and FIG. 9.

Figure 5:
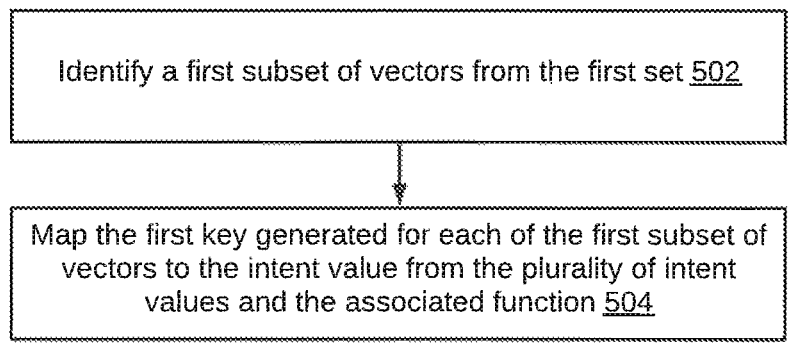
FIG. 5 illustrates a flowchart of a method for resolving a set of exceptions in a plurality of input vectors, in accordance with an embodiment.

Referring now to FIG. 5, a flowchart of a method for resolving a set of exception in a plurality of input vectors is illustrated, in accordance with an embodiment. With reference to FIG. 4, a first set of vectors are identified from a matrix and each vector in the first set is assigned an intent value below a predefined intent threshold at step 406. The first set of vectors may be extracted as a separate matrix. The separate matrix may include the first set of vectors, keys generated for each of the first set of vectors, the intent value as assigned at the step 406, and the associated one or more entities. It must be noted that one or more vectors in the first set of vectors may have the same key. This is illustrated in detail in conjunction with an exemplary embodiment of FIG. 10.

At step 502, a first subset of vector is identified from the first set of vectors, such that, a first key generated for each vector in the first subset of vectors is same. This is further illustrated in detail in conjunction with the exemplary embodiment of FIG. 10. Thereafter, at step 504, the first key generated for each of the first subset of vectors is mapped with an intent value from the plurality of intent values and the function associated with the intent value. The intent value is above the predefined intent threshold. Thus, for multiple vectors within the first subset, the first key needs to be mapped to the intent value only once. The same mapping need not be performed individually for each vector in the first subset. This is further explained in detail in conjunction with exemplary embodiments of FIG. 10 and FIG. 11.

Figure 6:
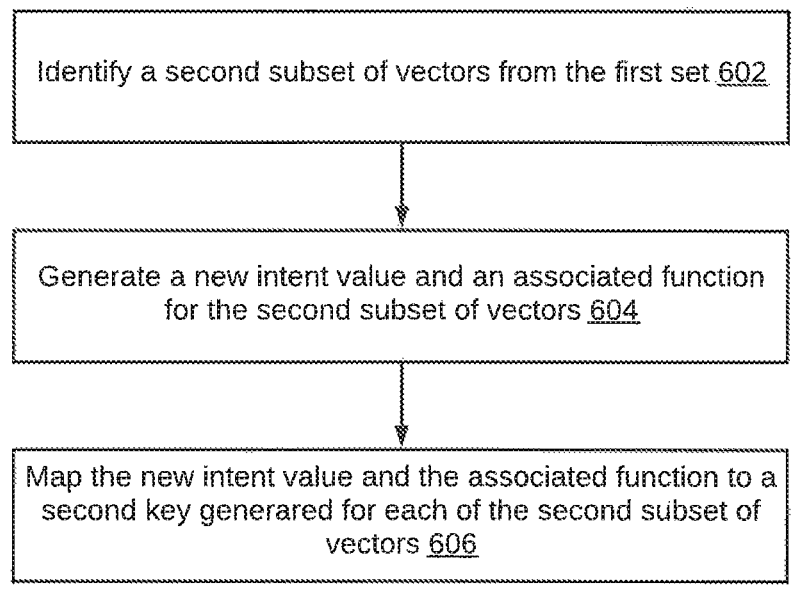
FIG. 6 illustrates a flowchart of a method for resolving a set of exception in a plurality of input vectors by generating a new set of parameters, in accordance with an embodiment.

Referring now to FIG. 6, a flowchart of a method for resolving a set of exception within a plurality of input vectors by generating a new intent value and an associated function is illustrated, in accordance with an embodiment. Referring back to FIG. 5, in a manner similar to identification of the first subset of vectors from the first set of vectors, at step 602, a second subset of vector is identified from the first set of vectors, such that, a second key generated for each of the second subset of vectors is the same. It will be apparent to a person skilled in the art that the second subset of vectors may include one or more vectors. In other words, the second subset of vectors may only include one vector. Moreover, for each of the second subset of vectors, a corresponding intent value is absent in the plurality of intent values. In other words, a function to process each of the second subset of vectors is not defined in the data transformation device 102 and thus an intent value to which the second key can be mapped is unavailable. This is further explained in detail in conjunction with the exemplary embodiment of FIG. 10 and FIG. 11.

Thereafter, at step 604, a new intent value and an associated function may be generated for the second subset of vectors. It may be noted that the new intent value generated is not a part of the plurality of intent values, Additionally, the function associated with the new intent value is also a new function that is generated. In an embodiment, the function may be a new code (for example, python code) that includes instructions to process the second subset of vectors. This is further explained in detail in conjunction with the exemplary embodiment of FIG. 11. Thereafter, at step 606, the new intent value and the associated function are mapped to the second key and thus to the second subset of vectors.

Figure 7:
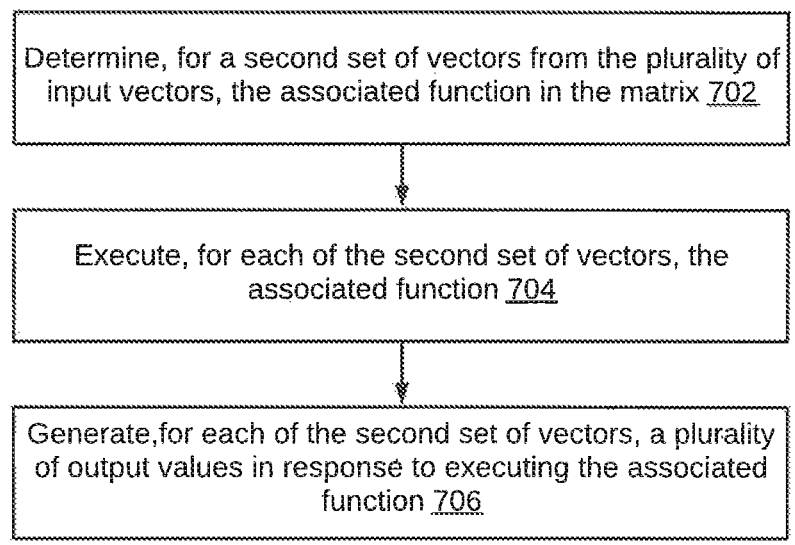
FIG. 7 illustrates a flowchart of a method for generating output values for each of a second set of vectors from a plurality of input vectors, in accordance with an embodiment.

Referring now to FIG. 7, a flowchart of a method for processing a second set of vectors to generate output values for the second set of vectors based on a trained ML model is illustrated, in accordance with an embodiment. Referring back to FIG. 3, once the first set of vectors have been identified from a plurality of input vectors, the remaining vectors in the plurality of input vectors are identified as the second set of vectors. In other words, the second set of vectors are vectors that are not exceptions. In an embodiment, to determine the second set of vectors, each vector in the matrix for which the intent value is greater than or equal to a predefined intent threshold is identified. All such vectors identified from the plurality of vectors form the second set of vectors.

Once the second set of vectors is identified, at step 702, for each of the second set of vectors, the associated function is determined in the matrix. At step 704, the associated function corresponding to each of the second set of vector is executed. In response to execution of the associated function, a plurality of output values corresponding to each of the second set of vectors may be generated at step 706. This is further explained in detail in conjunction with the exemplary embodiment of FIG. 12.

Referring now to FIG. 8, a matrix 800 that includes training vectors processed during training of an ML model is illustrated, in accordance with an exemplary embodiment. In this exemplary embodiment, the set of training vectors may be generated from patient age limit data stored in a column of a database (for example, an MS Excel sheet). The ML model may be trained using a set of eight generic patterns that correspond to patient age limit. The set of eight generic patterns are represented as training data in a column 802*a* of the matrix 800. Based on the training data of the column 802*a*, corresponding training vectors may be generated using NLP techniques as represented in a column 802*b*. Each of the training vectors may be associated with and mapped to a set of training parameter. The mapping is depicted in the matrix 800. The set of training parameters include a key (K), an entity (V), an intent value (G), and a function (F) associated with the intent value. The set of training parameters are represented in various columns of the matrix 800. For example, keys (K) in a column 806, intent values (G) in a column 808, functions (F) in a column 810, and entities (V) in a column 812.

In this exemplary embodiment, keys depicted in the column 806 may be generated based on a CRC2B hashing algorithm applied on the corresponding training vectors given in the column 802*b*. Each of the keys in the column 806 may be a unique key of 32 bits. Based on the hashing algorithm, for each training vector, a hashmap <K,G> may be generated. The intent value (G) for each training vector is above or equal to the predefined intent threshold. In this exemplary embodiment, the predefined intent threshold is set to 0. After training the ML model and based on the matrix 800, an information map stored in the information module 204 may be represented as depicted in lines (a) to (i) given below:

/usr/local/bin/TM . . . (a)
fd6d930a:0 . . . (b)
21d7e9f6:0 . . . (c)
6edd992f:1 . . . (d)
fd4005c6:1 . . . (e)
1363f226:2 . . . (f)
ff4d3605:2 . . . (g)
19daa9b9:3 . . . (h)
58b8a7d4:3 . . . (i)

The first line (a) of the information map represents a location of the transformation map in the transformation module 206. The transformation module 206 is present on the data transformation device 102 on which the data processing module 208 and the exception processing module 212 run. Each of the subsequent lines, i.e., lines (b) to (i) of the information map represent mapping of keys (K) given in the column 806 with the intent values (G) given in the column 808.

A transformation map may also be generated corresponding to the set of training vectors based on the intent values (G) as given in the column 808, which are used as an index. The transformation map may be represented as shown in lines (j) to (o) given below:

G={0, 1, 2, 3} . . . (j)
LookupTable[G]={F0, F1, F2, F3} . . . (k)
F0(a) . . . (l)
F1(a) . . . (m)
F2(a) . . . (n)
F3(a) . . . (o)

The first line (j) of the transformation map may represent the intent values (G) given in the column 808. A second line (k) of the transformation map may act as a lookup table for the functions (F) given in the column 810. The lookup table is indexed by the intent values (G) given in the column 808. The lines (l) to (o) represent four different functions, which are codes that may be executed corresponding to each of the functions (F) given in the column 810. The functions (F) in the column 810 may be coded in any scripting language, such as, Python, Perl, and PowerShell. By way of an example, a pseudo-code for the function F0 (represented in the line (l) of the transformation map) is given below. It must be noted that the function F0 implements a LessThan (i.e., '<') transformation:

```
function F0(a)
{
    if (input string "a" is all digits)
        convert input string "a" to an integer ia
    if (integer ia is less than or equal to 100 and greater than or equal to 0)
        return string("0 to ia")
    else
        return invalid_input
        return string(NULL)
}
```

Additionally, for each of the training vectors in the column 802*b*, the matrix 800 may include associated output values (Y) in a column 804 and a T flag setting (explained in description of FIG. 2) in a column 814. The output values given in the column 804 may be determined for each of the training vectors by applying corresponding function given in the column 810, based on the equation (1) explained in the description of FIG. 2. The matrix 800 may then be used to generate a matrix 900 for a plurality of input vectors. This is further explained in detail in conjunction with FIG. 9.

Referring now to FIG. 9, a matrix 900 that includes a set of parameters generated after processing a plurality of input vectors based on a trained ML model is illustrated, in accordance with an exemplary embodiment. The matrix 900 may be generated for input data based on the trained ML model, which has been trained based on the set of training data as explained in FIG. 8. In line with the set of training data, the input data in this exemplary embodiment also correspond to a data associated with patient age limit. Based on the input data as represented in a column 904*a* of the matrix 900, the plurality of input vectors may be generated. The plurality of input vectors may correspond to input vectors (Xi) given in a column 904*b* of the matrix 900. The matrix 900 may also include additional columns that may include a column 902 for row numbers, a column 906 for output values (Yi), a column 908 for E flags, a column 910 for keys (K), a column 912 for intent values (G), a column 914 for entities (V), and a column 916 for T flags. E flags and the T flags have already been explained in detail in conjunction with FIG. 2.

NLP techniques may be performed on each of the input vectors (Xi) given in the column 904*b* to generate a hash key <K, G> and one or more entities (V) as given in the column 914. It must be note that based on NLP pre-processing, all alphabetic characters in each of the input vectors (Xi) as given in the column 904*b* may be converted to lower case. Thus, for example, due to the NLP pre-processing, the hash key <K, G> generated for "Greater than" and "greater than"

may be the same. The trained ML model may generate the matrix 900 for the input vectors (Xi) given in the column 904b based on the matrix 800 or based on the data saved in the information map and the transformation map as explained in the description of FIG. 8. In the information map corresponding to the matrix 800, only the following keys are mapped to an intent value and thus an associated function in the transformation map. The mapping of keys (K) in the column 806 to the intent values (G) given in the column 808 is repeated below in line m:

fd6d930a:0, 21d7e9f6:0, 6edd992f:1, fd4005c6:1, 1363f226:2, ff4d3605:2, 19daa9b9:3, and 58b8a 7d4:3 . . . (m)

Based on the above mapping, any key (K) in the column 910 that matches with one of the keys (K) given in the column 806 (or in the line m above) is assigned the same intent value as that of the matching key in the column 806. By way of an example, for the input vector "less than", the generated key (K) as depicted in the column 910 and row number 2, matches with the key 21d7e9f6 as given in the column 806, which is generated for the training vector "less than". Thus, the intent value 0 is assigned to the input vector "less than". It will be apparent to a person skilled in the art that all such input vectors, for which, the corresponding key (K) given in the column 910 matches with one of the keys (K) given in the column 806, are assigned an intent value greater than or equal to the predefined intent threshold of 0. All such input vectors may correspond to the second set of input vectors as described in FIG. 7.

Further, for all such input vectors, an output value may be generated based on the function mapped with the matching key (K) as given in the column 810. In continuation of the example given above, the input vector "less than" is assigned the intent value 0, which is mapped to the function F0 in the transformation map and is depicted in the column 810. The F0 then operates on the entity 16 given in row 2 of the column 914 to provide output values (Yi) as "0 to 15", which are given in row 2 of the column 906.

Now, any key (K) in the column 910 that does not match with one of the keys (K) given in the column 806 (or in the line m above) is assigned an intent value of −1, which is below the predefined intent threshold of 0. All such input vectors that have been assigned an intent value of −1 are identified as a set of exceptions from the input vectors (Xi) given in the column 904b. As can be seen in FIG. 9, none of these set of exceptions have output values in the column 906, since, a function is not currently assigned to process these vectors: Handling of these set of exceptions is depicted and explained in conjunction with FIG. 10.

Figure 10:
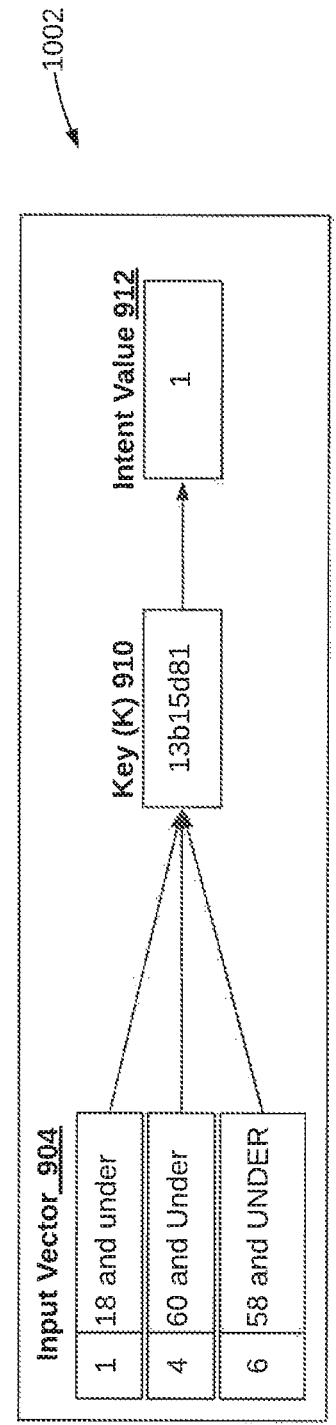
FIG. 10 illustrates a matrix that includes parameter values for a set of exceptions within a plurality of input vectors that remains unprocessed, in accordance with an exemplary embodiment.

Referring now to FIG. 10, a matrix 1000 that includes parameter values for a set of exceptions within a plurality of input vectors that remain unprocessed is illustrated, in accordance with an exemplary embodiment. The matrix 1000 includes the set of exceptions and corresponding parameters as given in the matrix 900. In other words, the matrix 1000 is a subset of the matrix 900 and is a result of filtering the set of exceptions from the matrix 900. The set of exceptions may correspond to the first set of vectors as described in the FIG. 3. With reference to the FIG. 9, the matrix 1000 includes the column 902, the column 904a, the column 904b, the column 910, the column 912, and the column 914.

In the matrix 1000, all input vectors in the column 904b that have the same key in the column 910 are identified. These vectors are the first subset of vector as described in the FIG. 5. By way of an example, vectors in the rows 1, 4, and 6 have the same key: 13b15d81, vectors in rows 5, 9, and 13 have the same key: 56bd7a48, and vectors in rows 14 and 15 have the same key: 3c0d5aba. In contrast, vector in row 16 has a key that is different from keys of other vectors. The determination of two or more vectors having the same key may be performed automatically.

Thereafter, a user may map each of the keys (K) in the column 910 of the matrix 1000 to an intent value that is greater than or equal to the predefined intent threshold, i.e., 0. The mapping of a key may be performed based on the corresponding vector in the column 904b and the information map and the transformation map updated in the database 202. By way of an example, the mapping of one of the keys (K) in the column 910 is depicted in a box 1002. The vectors in rows 1, 4, and 6 that have the same key, i.e., 13b15d81, are considered in this example. Each of the vectors in rows 1, 4, and 6 may be represented using the expression: <"entity" "and under">, thus the intent in each of these vectors is "and under" which is equivalent to the expression '≤' The expression '≤' is already mapped to an intent value of 1 in the information map. This mapping is also depicted in the columns 802 and 808 of the matrix 800. Thus, the user may map the key 13b15d81 to the intent value 1 as depicted in the box 1002. Now, since the intent value 1 is mapped to the function F1 in the transformation map, the function F1 is assigned for processing of each of the vectors in rows 1, 4, and 6. It will be apparent to a person skilled in the art that the mapping for vectors having the same key is performed only once, as depicted in the box 1002.

In a similar manner as described above, other vectors in the matrix 1000 are handled and resolved by referring to the information map or the matrix 800. The vectors in rows 5, 9, and 13 with the key 56bd7a48 are mapped to the intent value 3 and the function F3 and vectors in rows 14 and 15 that have the key 3c0d5aba are mapped to the intent value 2 and the function F2. After mapping of each vector in the column 904b of the matrix 1000 to relevant intent value and function, each of these vectors may be processed based on the corresponding function to generate output for each of these vectors. This is further depicted in conjunction with the exemplary embodiment given in FIG. 12.

With regards to the vector in the row 16 of the matrix 1000, the vector does not have an intent value and an associated function already defined in the database 202. This vector is unique, as unlike other vectors, it has two entities. This input vector corresponds to the second subset of vector as described in FIG. 6. For this vector, a new intent value and a new associated function corresponding to the new intent value may be generated. The new intent value may be generated by generating a new hash map. The new associated function may be generated by developing a new code by using the new intent value as an index. The new code may be generated using any of the scripting languages. In this exemplary embodiment, the new intent value (G) may be represented as G=4, and the new code may be represented as a function F4. A sample pseudo-code for the function F4 is given below:

```
function F4(a, b)
{
    if (input string "a" is all digits and input string "b" is all digits)
        convert input string "a" to an integer ia
        convert input string "b" to an integer ib
    else
        return invalid_input
    if (ia is greater than or equal to 1 and ib is less than or equal to
```

```
        100)
            return string("ia to ib")
        else
            return invalid_input
            return string(NULL)
}
```

Once intent values and associated functions have been mapped for each vector in the column 904b of the matrix 1000, the exception resolution module 210 may send an update notification to the exception processing module 212. By way of an example, the update notification may be represented as shown below:

(K=13b15d81, G=1), (K=56bd7a48, G=3), (K=3c0d5aba, G=2), (K=0f927f7e, G=4, F=F4)

Referring now to FIG. 11, a matrix 1100 that includes modified parameter values after resolving a set of exceptions within a plurality of input vectors is illustrated, in accordance with an exemplary embodiment. The matrix 1100 is represented with reference to the FIG. 10 and is generated based on resolution of the set of exceptions as explained in detail in FIG. 10. The set of exceptions may correspond to the first set of vectors from the plurality of vectors. In an embodiment, the resolution of the first set of vectors may be updated by the exception processing module 212. In this exemplary embodiment, for resolving each of the first set of vectors, the exception processing module 212 may update the information map and the transformation map based on the update notification. Additionally, the exception processing module 212 may clear a corresponding E flag of the first set of vectors from the database 202. By way of an example, a sample pseudo-code for the resolution of the first set of vectors is given below:

for each K in new (K, G) pair or (K, G, F) triplet from the
    exception resolution module 210
    for each row #r having K
    update G for row #r
    fetch V from row #r
    find F from LookupTable in TM using index G
    execute Y=F(V)
    save Y in DB for row #1
    clear E flag in row #r After resolution of the vectors in the column 904b (or the set of exceptions) of the matrix 1000, an updated information map may be represented as given below:

/usr/local/bin/TM
fd6d930a:0
1363f226:2
ff4d3605:2
3c0d5aba:2
19daa9b9:3
58b8a7d4:3
56bd7a48:3
0f927f7e:4

In a similar manner, an updated transformation map may be represented as given below:

G={0, 1, 2, 3, 4}
LookupTable[G]={F0, F1, F2, F3, F4}
F0(a)
F1(a)
F2(a)
F3(a)
F4(a, b)

Referring now to FIG. 12, a matrix 1200 that includes a set of parameters for each of a plurality of input vectors after resolution of a set of exceptions is illustrated, in accordance with an exemplary embodiment. The matrix 1200 is generated after an update of output values corresponding to each of the first set of vectors from the plurality of input vectors. It will be apparent that the matrix 1200 is similar to the matrix 900, the difference being that each exception in the matrix 900 (marked with an intent value of −1) is now mapped to an intent value and an associated function. Additionally, the output for each of these exceptions received after executing the associated function is also included in the column 906 of the matrix 1200.

Thus, unlike other traditional ML models, the proposed ML model may be deployed without training. Moreover, the ML model may get continuously trained during production deployment. The amount of required training may be decided based on a latency tolerated by downstream applications corresponding to output values. For low latency application, a good amount of initial training may be needed, whereas for high latency application, minimal or even no training may be needed. By way of an example, for an untrained ML model all input vectors may lead to exceptions. Based on the technique described in conjunction to FIG. 3 to FIG. 12, the ML model may learn to handle the input vectors that may produce the exceptions. Moreover, the ML model may get better over time with continuous feedback. Thereby, the ML model may reduce a requirement for an human intervention with time. Eventually, based on continuous feedback, the ML model may reach a state of autonomous behavior and may function without any human assistance.

Figure 13:
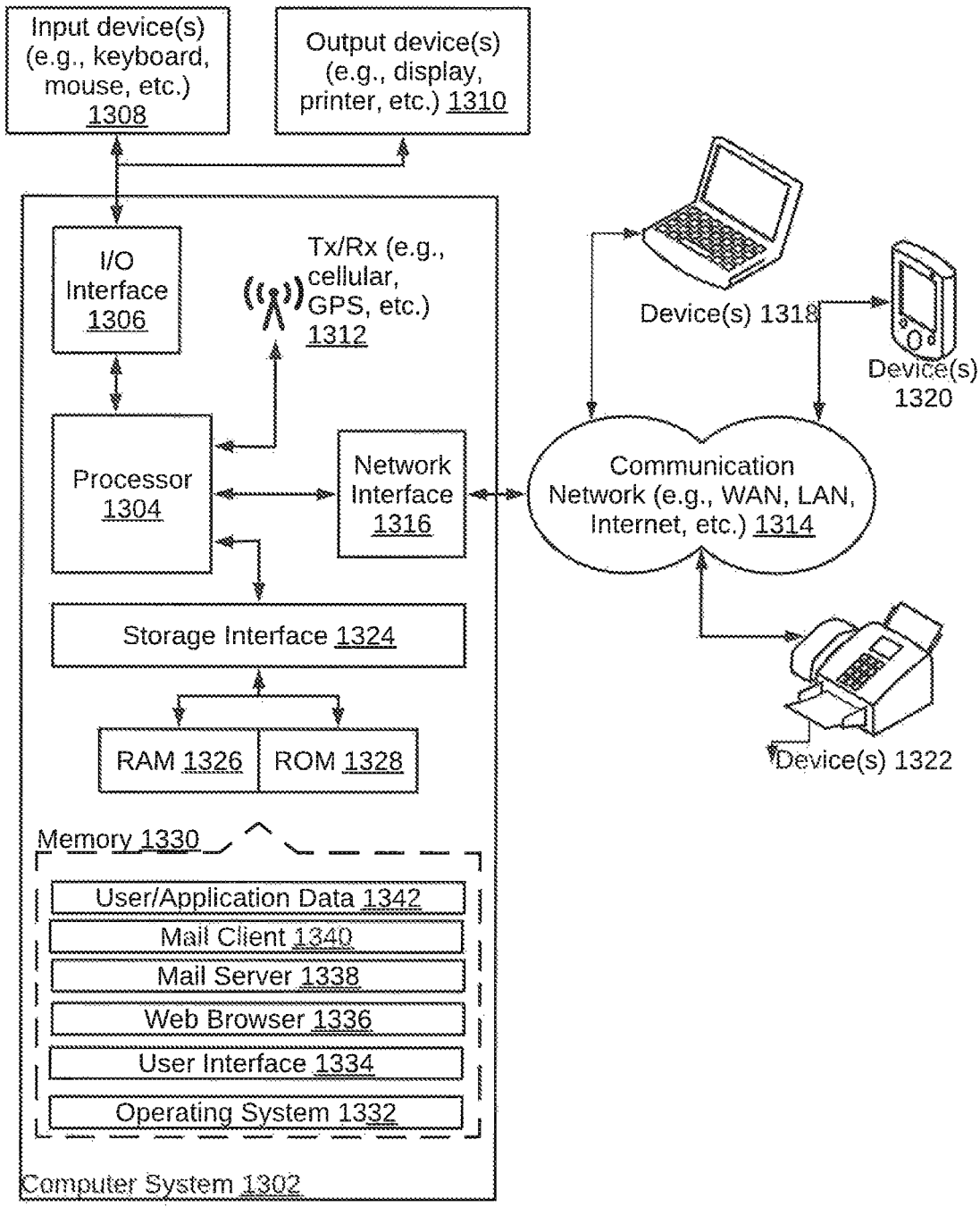
FIG. 13 illustrates a block diagram of an exemplary computer system for implementing embodiments consistent with the present disclosure.

Referring now to FIG. 13, a block diagram of an exemplary computer system 1302 for implementing various embodiments is illustrated. Computer system 1302 may include a central processing unit ("CPU" or "processor") 1304. Processor 1304 may include at least one data processor for executing program components for executing user or system-generated requests. A user may include a person, a person using a device such as those included in this disclosure, or such a device itself. Processor 1304 may include specialized processing units such as integrated system (bus) controllers, memory management control units, floating point units, graphics processing units, digital signal processing units, etc. Processor 1304 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1304 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1304 may be disposed in communication with one or more input/output (I/O) devices via an I/O interface 1306. I/O interface 1306 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1306, computer system 1302 may communicate with one or more I/O devices. For example, an input device 1308 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1310 may be a printer, fax machine, video display (for example, cathode ray tube (CRT), liquid crystal display (LCD), light-emitting diode (LED), plasma, or the like), audio speaker, etc. In some embodiments, a transceiver 1312 may be disposed in connection with processor 1304. Transceiver 1312 may facilitate various types of wireless transmission or reception. For example, transceiver 1312 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1304 may be disposed in communication with a communication network 1314 via a network interface 1316. Network interface 1316 may communicate with communication network 1314, Network interface 1316 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1314 may include, without limitation, a direct interconnection, local area network (LAN), wide area network (WAN), wireless network (for example, using Wireless Application Protocol), the Internet, etc. Using network interface 1316 and communication network 1314, computer system 1302 may communicate with devices 1318, 1320, and 1322. These devices 1318, 1320, and 1322 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1302 may itself embody one or more of these devices 1318, 1320, and 1322.

In some embodiments, processor 1304 may be disposed in communication with one or more memory devices 1330 (for example, RAM 1326, ROM 1328, etc.) via a storage interface 1324. Storage interface 1324 may connect to memory 1330 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1330 may store a collection of program or database components, including, without limitation, an operating system 1332, user interface application 1334, web browser 1336, mail server 1338, mail client 1340, user/application data 1342 (for example, any data variables or data records discussed in this disclosure), etc. Operating system 1332 may facilitate resource management and operation of computer system 1302. Examples of operating systems 1332 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1334 may facilitate display, execution, interaction, manipulation, or operation of program components through textual or graphical facilities. For example, user interfaces 1334 may provide computer interaction interface elements on a display system operatively connected to computer system 1302, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1302 may implement a web browser 1336 stored program component. Web browser 1336 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1302 may implement a mail server 1338 stored program component. Mail server 1338 may be an Internet mail server such as MICROSOFT® EXCHANGE® mail server, or the like. Mail server 1338 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1338 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1302 may implement a mail client 1340 stored program component. Mail client 1340 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1302 may store user/application data 1342, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for data transformation based on ML. The benefit of the invention is that the invention doesn't require any initial training, unlike most ML models. The training of ML model is done via same framework and techniques without requiring any special configuration. Moreover, the invention avoids the need of expensive retraining and software updates (done via expensive SDLC) of the ML model. The ML model of the invention produces precise data transformation, unlike other statistical ML models. Furthermore, the invention saves a lot of time in input to output data transformations for large data sets as the IDE helps in productionizing transformation functions faster. Additionally, the invention utilizes continuous feedback ML that helps in improving accuracy of the ML model over time. Furthermore, the invention is easily extendable to structured and semi-structured input data.

The specification has described method and system for data transformation based on ML. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for data transformation based on machine learning comprising, the method comprising:
   generating, by a data transformation device, a matrix for a plurality of input vectors based on a machine learning model, wherein for each of the plurality of input vectors, the matrix comprises a set of parameters comprising a key, at least one entity, an intent value from a plurality of intent values, and a function associated with the intent value;
   comparing, by the data transformation device, for each of the plurality of input vectors, the intent value in the matrix with a predefined intent threshold, wherein, for each of the plurality of input vectors, the intent value being below the predefined intent threshold, an associated function is unavailable;
   determining, by the data transformation device, a first set of vectors from the plurality of input vectors based on the comparing, wherein for each input vector in the first set, an associated intent value is below the predefined intent threshold; and
   mapping, by the data transformation device, each input vector in the first set with a new intent value above the predefined intent threshold and the associated function.

2. The method of claim 1, further comprising:
   generating the plurality of input vectors from a plurality of input data based on Natural Language Processing (NLP) techniques, wherein the plurality of input data corresponds to unstructured data; and
   generating a key for each of the plurality of input vectors.

3. The method of claim 1, wherein the mapping comprises:
   identifying a first subset of vectors from the first set, wherein a first key generated for each of the first subset of vectors is the same, and wherein the first subset of vectors corresponds to an intent value from the plurality of intent values; and
   mapping the first key generated for each of the first subset of vectors to the intent value from the plurality of intent values and the associated function.

4. The method of claim 1, wherein the mapping comprises:
   identifying a second subset of vectors from the first set, wherein a second key generated for each of the second subset of vectors is the same, and an intent value corresponding to the second subset of vectors is absent in the plurality of intent values;
   generating a new intent value and an associated function for the second subset of vectors, wherein the new intent value is absent from the plurality of intent values; and
   mapping the new intent value and the associated function to the second key.

5. The method of claim 1, further comprising:
  determining, for a second set of vectors from the plurality of input vectors, the associated function in the matrix, wherein for each of the second set of vectors the intent value in the matrix is greater than or equal to the predefined intent threshold;
  executing, for each of the second set of vectors, the associated function; and
  generating, for each of the second set of vectors, a plurality of output values in response to executing the associated function.

6. The method of claim 5, wherein, for each of the second set of vectors, the associated function operates on the at least one entity in the matrix.

7. The method of claim 1, further comprises training the machine learning model to generate the matrix based on a set of training vectors, wherein each of the set of training vectors comprises an associated set of training parameters.

8. The method of claim 7, wherein, for a training vector in the set of training vectors, the associated set of training parameters comprises mapping of a key generated for the training vector with each of an at least one entity, an intent value from the plurality of intent values, and a function associated with the intent value, and wherein the intent value is greater than or equal to the predefined intent threshold.

9. The method of claim 8, wherein generating the matrix for the plurality of input vectors comprises:
  matching a key generated for each of the plurality of input vectors with a set of keys associated with the set of training vectors; and
  assigning an intent value below the predefined intent threshold to each of the first set of vectors, wherein keys generated for the first set of vectors fail to match with the set of keys associated with the set of training vectors.

10. The method of claim 1, further comprising performing incremental learning of the machine learning model based on the mapping of each input vector in the first set with an intent value above the predefined intent threshold and the associated function.

11. A system for data transformation based on machine learning, the system comprising:
  a processor; and
  a memory communicatively coupled to the processor, wherein the memory stores processor instructions, which, on execution, causes the processor to:
    generate a matrix for a plurality of input vectors based on a machine learning model, wherein for each of the plurality of input vectors, the matrix comprises a set of parameters comprising a key, at least one entity, an intent value from a plurality of intent values, and a function associated with the intent value;
    compare, for each of the plurality of input vectors, the intent value in the matrix with a predefined intent threshold, wherein, for each of the plurality of input vectors, the intent value being below the predefined intent threshold, the associated function is unavailable;
    determine a first set of vectors from the plurality of input vectors based on the comparing, wherein for each input vector in the first set, an associated intent value is below the predefined intent threshold; and
    map each input vector in the first set with a new intent value above the predefined intent threshold and the associated function.

12. The system of claim 11, wherein the processor instructions further cause the processor to:
  generate the plurality of input vectors from a plurality of input data based on Natural Language Processing (NLP) techniques, wherein the plurality of input data corresponds to unstructured data; and
  generate a key for each of the plurality of input vectors.

13. The system of claim 11, wherein the processor instructions further cause the processor to:
  identify a first subset of vectors from the first set, wherein a first key generated for each of the first subset of vectors is the same, and wherein the first subset of vectors corresponds to an intent value from the plurality of intent values; and
  map the first key generated for each of the first subset of vectors to the intent value from the plurality of intent values and the associated function.

14. The system of claim 11, wherein the processor instructions further cause the processor to:
  identify a second subset of vectors from the first set, wherein a second key generated for each of the second subset of vectors is the same, and an intent value corresponding to the second subset of vectors is absent in the plurality of intent values;
  generate a new intent value and an associated function for the second subset of vectors, wherein the new intent value is absent from the plurality of intent values; and
  map the new intent value and the associated function to the second key.

15. The system of claim 11, wherein the processor instructions further cause the processor to:
  determine, for a second set of vectors from the plurality of input vectors, the associated function in the matrix, wherein for each of the second set of vectors the intent value in the matrix is greater than or equal to the predefined intent threshold;
  execute, for each of the second set of vectors, the associated function; and
  generate, for each of the second set of vectors, a plurality of output values in response to executing the associated function.

16. The system of claim 15, wherein for each of the second set of vectors, the associated function operates on the at least one entity in the matrix.

17. The system of claim 11, wherein the processor instructions further cause the processor to train the machine learning model to generate the matrix based on a set of training vectors, wherein each of the set of training vectors comprises an associated set of training parameters.

18. The system of claim 17, wherein for a training vector in the set of training vectors, the associated set of training parameters comprises mapping of a key generated for the training vector with each of an at least one entity, an intent value from the plurality of intent values, and a function associated with the intent value, and wherein the intent value is greater than or equal to the predefined intent threshold.

19. The system of claim 18, wherein the processor instructions further cause the processor to:
  match a key generated for each of the plurality of input vectors with a set of keys associated with the set of training vectors; and
  assign an intent value below the predefined intent threshold to each of the first set of vectors, wherein keys generated for the first set of vectors fail to match with the set of keys associated with the set of training vectors.

20. The system of claim 1, wherein the processor instructions further cause the processor to perform incremental learning of the machine learning model based on the mapping of each input vector in the first set with an intent value above the predefined intent threshold and the associated function.

21. A non-transitory computer-readable storage medium having stored thereon, a set of computer-executable instructions causing a computer comprising one or more processors to perform steps comprising:

generating, by a data transformation device, a matrix for a plurality of input vectors based on a machine learning model, wherein for each of the plurality of input vectors, the matrix comprises a set of parameters comprising a key, at least one entity, an intent value from a plurality of intent values, and a function associated with the intent value;

comparing, by the data transformation device, for each of the plurality of input vectors, the intent value in the matrix with a predefined intent threshold, wherein, for each of the plurality of input vectors, the intent value being below the predefined intent threshold, an associated function is unavailable;

determining, by the data transformation device, a first set of vectors from the plurality of input vectors based on the comparing, wherein for each input vector in the first set, an associated intent value is below the predefined intent threshold; and mapping, by the data transformation device, each input vector in the first set with a new intent value above the predefined intent threshold and the associated function.

* * * * *